(12) United States Patent
Chen et al.

(10) Patent No.: US 11,502,757 B1
(45) Date of Patent: Nov. 15, 2022

(54) METHOD OF MANUFACTURING DEVICE WITH OPTICAL COMPONENT DISPOSED THEREON AND TRANSMISSION DEVICE MANUFACTURED BY THE SAME

(71) Applicant: QuantumZ Inc., Kaohsiung (TW)

(72) Inventors: Chun-Chieh Chen, Kaohsiung (TW);
Ming-Che Hsieh, Kaohsiung (TW);
Po-Ting Chen, Kaohsiung (TW);
Chun-I Wu, Kaohsiung (TW)

(73) Assignee: QUANTUMZ INC., Kaohsiung (TW)

( * ) Notice: Subject to any disclaimer, the term of this patent is extended or adjusted under 35 U.S.C. 154(b) by 0 days.

(21) Appl. No.: 17/386,920

(22) Filed: Jul. 28, 2021

(51) Int. Cl.
| | | |
|---|---|---|
| *H04B 10/67* | (2013.01) | |
| *H04B 10/50* | (2013.01) | |
| *H04B 10/43* | (2013.01) | |
| *H04B 10/40* | (2013.01) | |
| *H04B 10/60* | (2013.01) | |

(52) U.S. Cl.
CPC .......... *H04B 10/67* (2013.01); *H04B 10/501* (2013.01); *H04B 10/40* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 4,735,677 A | * | 4/1988 | Kawachi | G02B 6/4246 438/31 |
| 5,221,984 A | * | 6/1993 | Furuyama | H04B 10/2507 333/28 R |
| 7,703,993 B1 | * | 4/2010 | Darbinyan | G02B 6/4214 385/88 |
| 8,355,605 B1 | * | 1/2013 | Wach | H04B 10/506 385/32 |
| 2002/0033980 A1 | * | 3/2002 | Lo | G02B 6/4246 398/164 |
| 2004/0136639 A1 | * | 7/2004 | Kondo | H01L 24/82 385/14 |
| 2006/0279734 A1 | * | 12/2006 | Yan | G02B 6/12011 356/329 |
| 2010/0008675 A1 | * | 1/2010 | De Dobbelaere | G02B 6/12019 398/135 |
| 2012/0141143 A1 | * | 6/2012 | Hayashi | G02B 6/4206 398/201 |
| 2019/0158183 A1 | * | 5/2019 | Butrie | H04J 14/06 |

* cited by examiner

*Primary Examiner* — Darren E Wolf
(74) *Attorney, Agent, or Firm* — Muncy, Geissler, Olds & Lowe, P.C.

(57) ABSTRACT

A method of manufacturing a device with a optical component disposed thereon, including following steps of: preparing a substrate, the substrate including a signal guide and an electric conductive structure; and mounting an optical component on the substrate and corresponding a light transmission face of the optical component to the signal guide, wherein the optical component and the substrate is connected by an adhesive material and the optical component electrically connected with the electric conductive structure. A transmission device being made by the method of manufacturing the device with the optical component disposed thereon as described above is further provided.

14 Claims, 18 Drawing Sheets

METHOD OF MANUFACTURING DEVICE WITH OPTICAL COMPONENT DISPOSED THEREON AND TRANSMISSION DEVICE MANUFACTURED BY THE SAME

BACKGROUND OF THE INVENTION

Field of the Invention

The present invention relates to a method of manufacturing a device with an optical component disposed thereon and a transmission device manufactured by the same.

Description of the Prior Art

With the progression of the internet and telecommunication in recent years, the large data transmission has been required. Conventionally, electrical signal is used to transmit data. However, the coupling efficiency and bandwidth of the electrical transmission way are more and more insufficient. Accordingly, optical transmission device is therefore developed.

In a conventional process of manufacturing the optical transmission device, contacts of an optical transmitter and its light emitting surface (or the light receiving surface of the optical receiver) are disposed on the same side, and the light emitting surface corresponds to the optical waveguide board while the pins are connected with the circuit board, which may cause the light emitting surface to be out of alignment with the optical waveguide board and coupling loss.

In addition, in a conventional optical transmission device, there is usually an air gap between the optical waveguide board and the optical transmitter or the optical receiver, which causes the divergence angle of the light projecting from the optical transmitter toward the optical waveguide board or the divergence angle of the light projecting from the optical waveguide board toward the optical receiver to be large, and this results in high loss and low optical coupling efficiency, especially in the broadband communication.

The present invention is, therefore, arisen to obviate or at least mitigate the above-mentioned disadvantages.

SUMMARY OF THE INVENTION

The main object of the present invention is to provide a method of manufacturing a device with an optical component disposed thereon and a transmission device manufactured by the same, which provides low loss and high coupling efficiency.

To achieve the above and other objects, the present invention provides a method of manufacturing a device with an optical component disposed thereon, including following steps of: preparing a substrate, the substrate including a signal guide and an electric conductive structure; and mounting the optical component on the substrate and corresponding a light transmission face of the optical component to the signal guide, wherein the optical component and the substrate is connected by an adhesive material and the optical component is electrically connected with the electric conductive structure.

To achieve the above and other objects, the present invention further provides a transmission device being made by the method of manufacturing the device with the optical component disposed thereon as described above.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 5 for a preferable embodiment of the present invention. A method of manufacturing a device with an optical component disposed thereon includes following steps.

Figure 1:
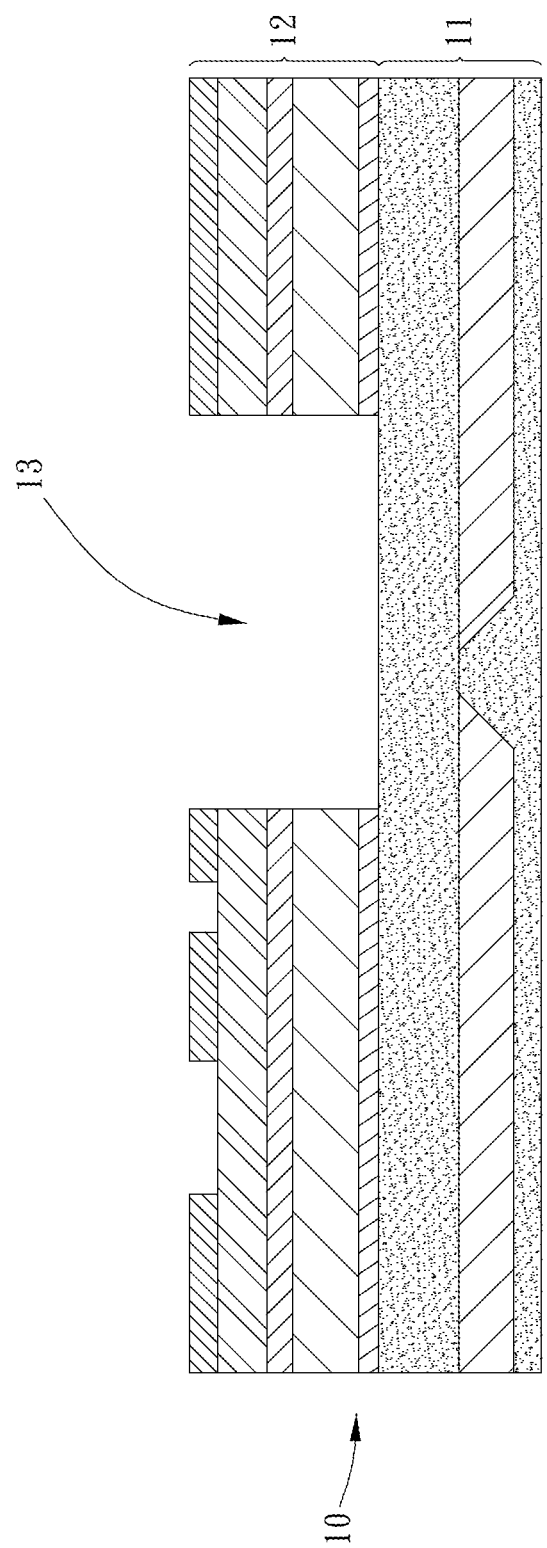
FIGS. 1-4 are drawings showing manufacturing steps according to a preferable embodiment of the present invention.

A substrate 10 is prepared. The substrate 10 includes a signal guide 11 and an electric conductive structure 12. The signal guide 11 may be an optical waveguide, or any other guiding structure which can be used to transmit signal. The electric conductive structure 12 may be a circuit board and includes at least one electric conductive layer 121. In this embodiment, the step of preparing the substrate 10 includes a step of forming a cavity 13 on the substrate 10, as shown in FIG. 1.

The optical component (such as optical transmitter 20, optical receiver 20a, or any other optical component) is mounted on the substrate 10 and a light transmission face 21 of the optical component corresponds to the signal guide 11. The optical component and the substrate 10 are connected by an adhesive material 30 and the optical component is electrically connected with the electric conductive structure 12. Preferably, the optical component is arranged within the cavity 13, and the light transmission face 21 faces a bottom side 131 of the cavity 13 and corresponds to a reflective face 111 of the signal guide 11 so that a distance between the light transmission face 21 and the reflective face 111 is decreased, which minimizes divergence of light and optical loss.

Figure 4:
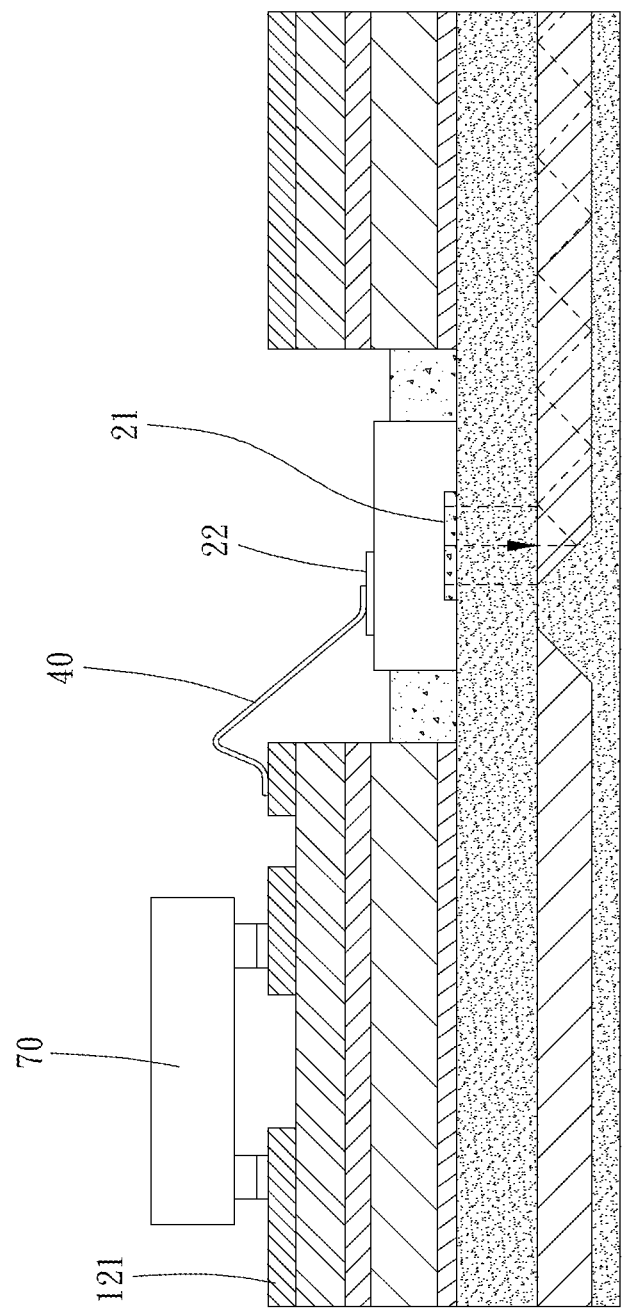
Figure 5:
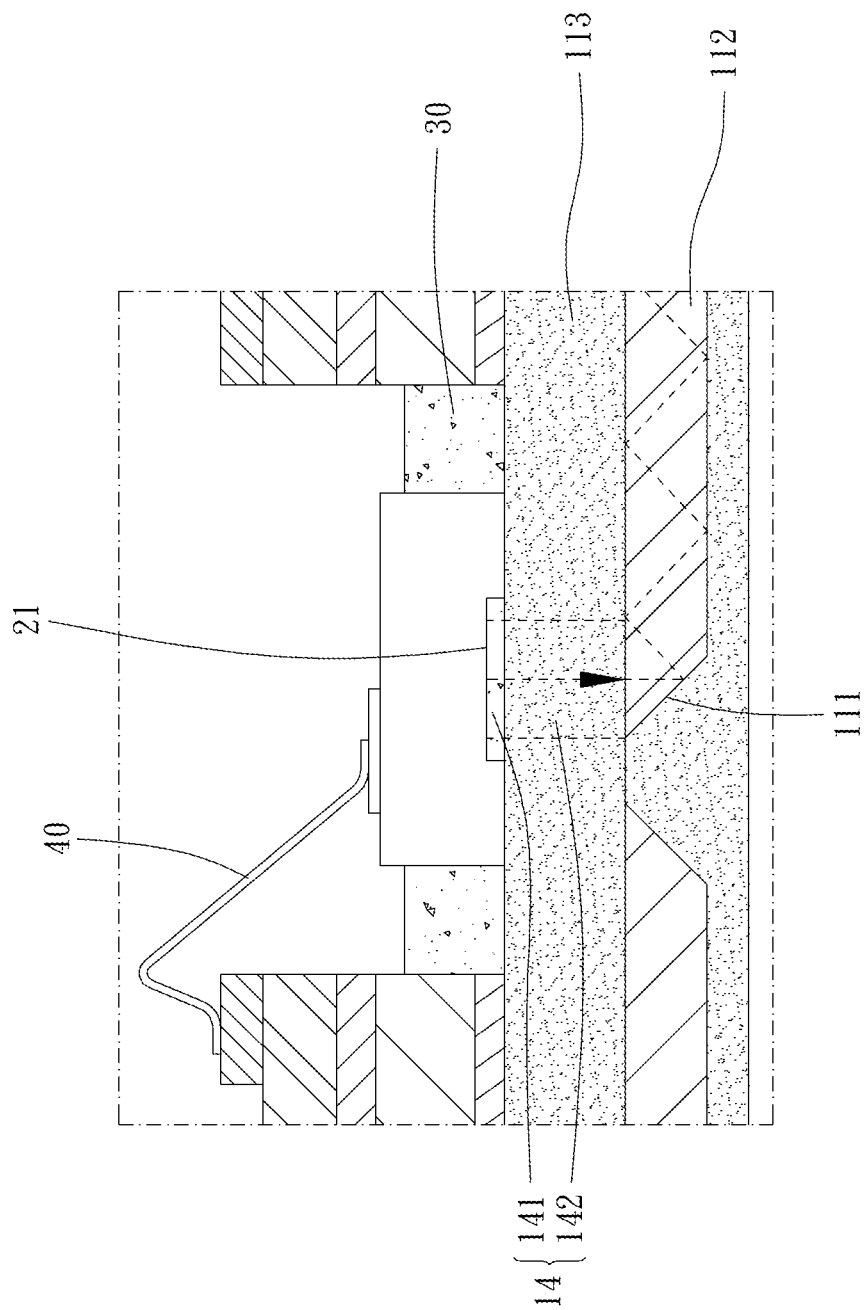
FIG. 5 is a partial enlargement of FIG. 4.
Figure 10:
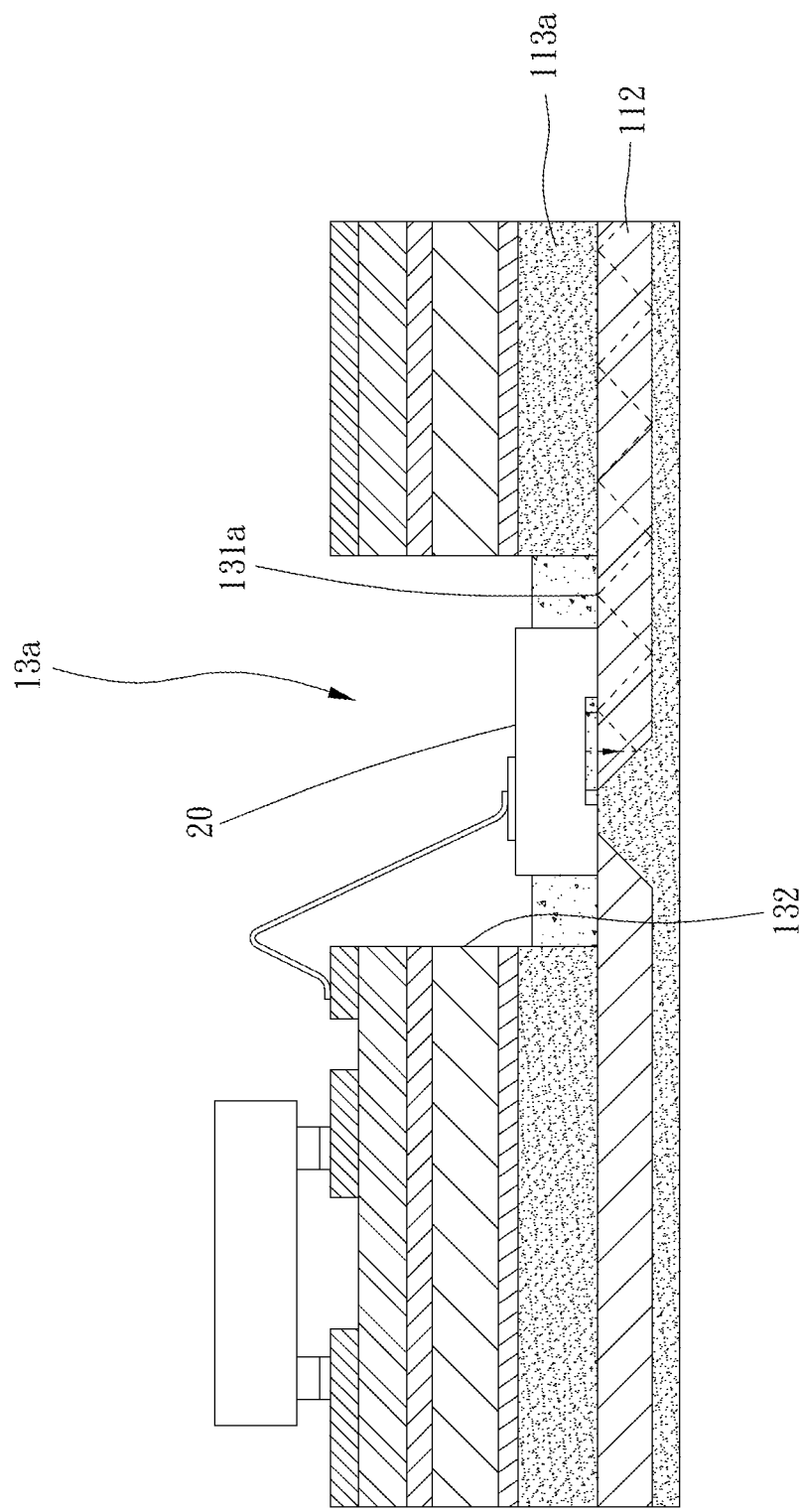
FIGS. 10 and 11 are drawings showing transmission devices including different depths of cavities according to preferable embodiments of the present invention.

Specifically, the signal guide 11 includes a transmission layer 112 and a first layer 113 located a side of the transmission layer 112 adjacent to the electric conductive structure 12. The reflective face 111 is angled to the bottom side 131 and configured to reflect a transmission signal from the optical component toward the transmission layer 112 or configured to reflect the transmission signal from the transmission layer 112 toward the optical component. At least one of the transmission layer 112 and the first layer 113 is exposed to the cavity 13, and the optical component is disposed on one of the transmission layer 112 and the first layer 113. In this embodiment, the optical component is an optical transmitter 20; the first layer 113 is exposed to the bottom side 131 and the optical transmitter 20 is disposed on the first layer 113, as shown in FIGS. 4 and 5, so that the distance between the light transmission face 21 and the reflective face 111 is largely decreased to increase coupling efficiency. In other embodiments, the first layer 113a is exposed to a lateral side 132 of the cavity 13a and the transmission layer 112 is exposed to the bottom side 131a, and the optical transmitter 20 is disposed on the transmission layer 112, as shown in FIG. 10, which provides good coupling efficiency, less loss and easy assembling.

The signal guide 11 further includes a second layer 114 opposite to the first layer 113. Each of the first layer 113 and the second layer 114 may be in gaseous, liquid or solid state, such as air, water or metal, or any substance provided with a refractive index smaller than a refractive index of the transmission layer 112 so that the transmission signal can be transmitted by total reflection in the signal guide 11.

Preferably, the adhesive material 30 is selected from an optical auxiliary material being light-transmittable and is at least partially filled between the bottom side 131 and the light transmission face 21. The optical component is at least partially exposed out of the adhesive material 30 so that heat generated during operation can be rapidly dissipated to external environment. The optical auxiliary material may be high transmittance glue, optical glue, underfill material, or any organic or inorganic transmittance material with a refractive index smaller than a refractive index of the transmission layer 112. Therefore, the optical auxiliary material can stably attach the optical component to the substrate 10 and allows light to pass therethrough, meanwhile, effectively reduce light divergence.

Figure 12:
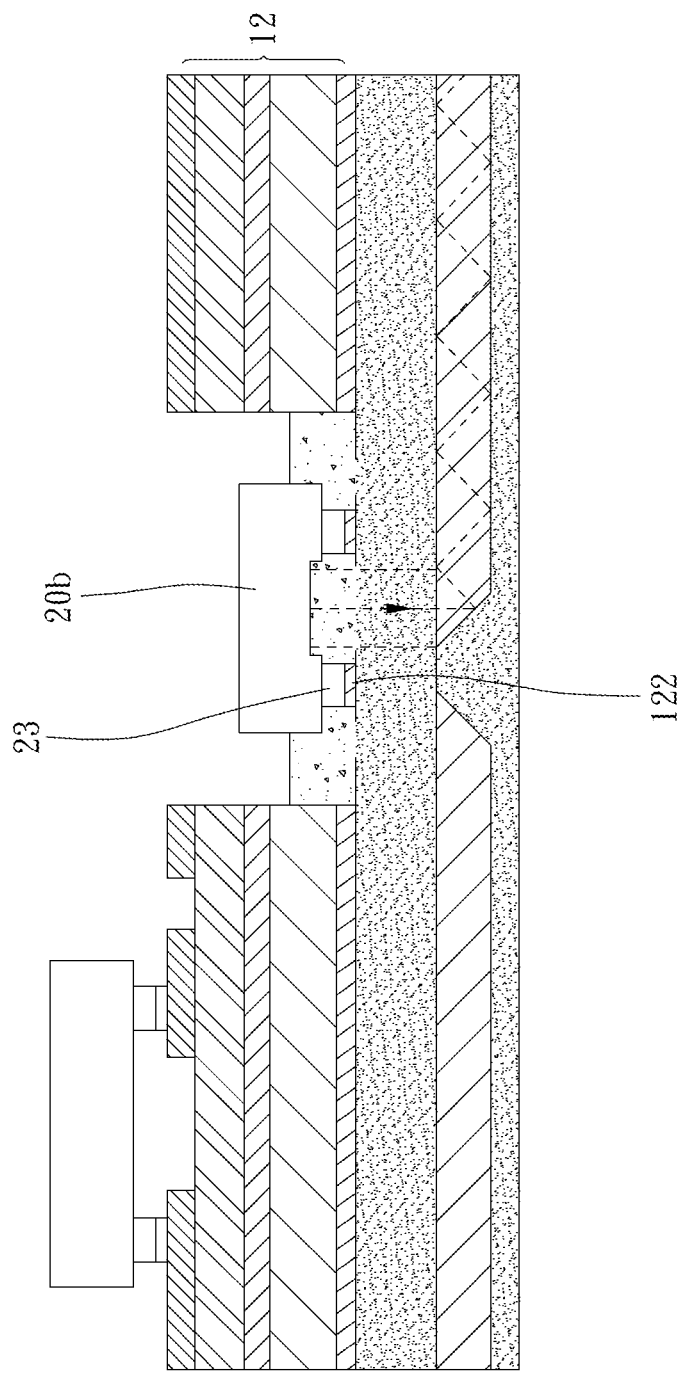
FIGS. 12-14 are drawings showing transmission devices including different depths of cavities and optical components connected with respective substrates by pins and contacts according to preferable embodiments of the present invention.
Figure 13:
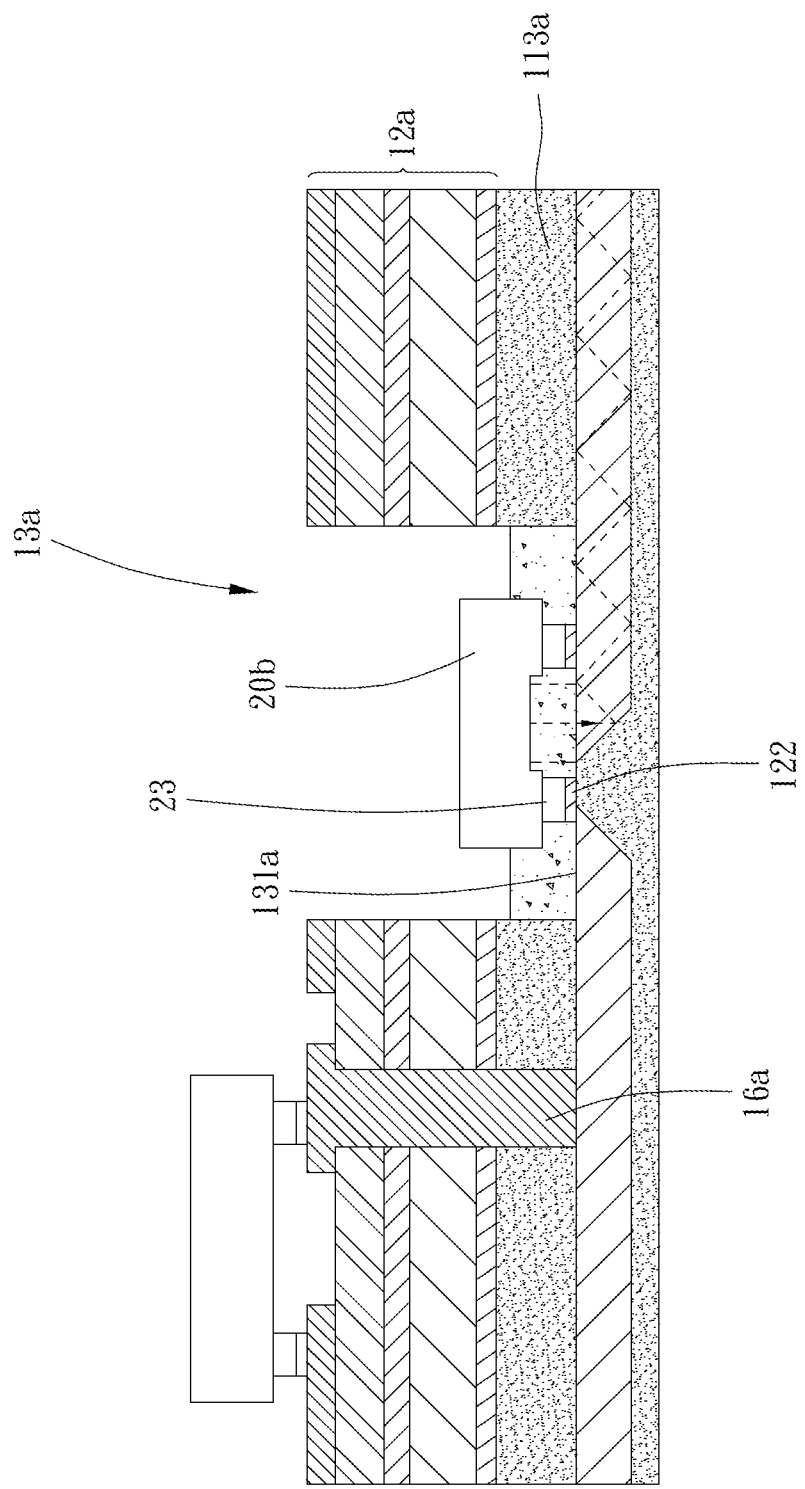
Figure 14:
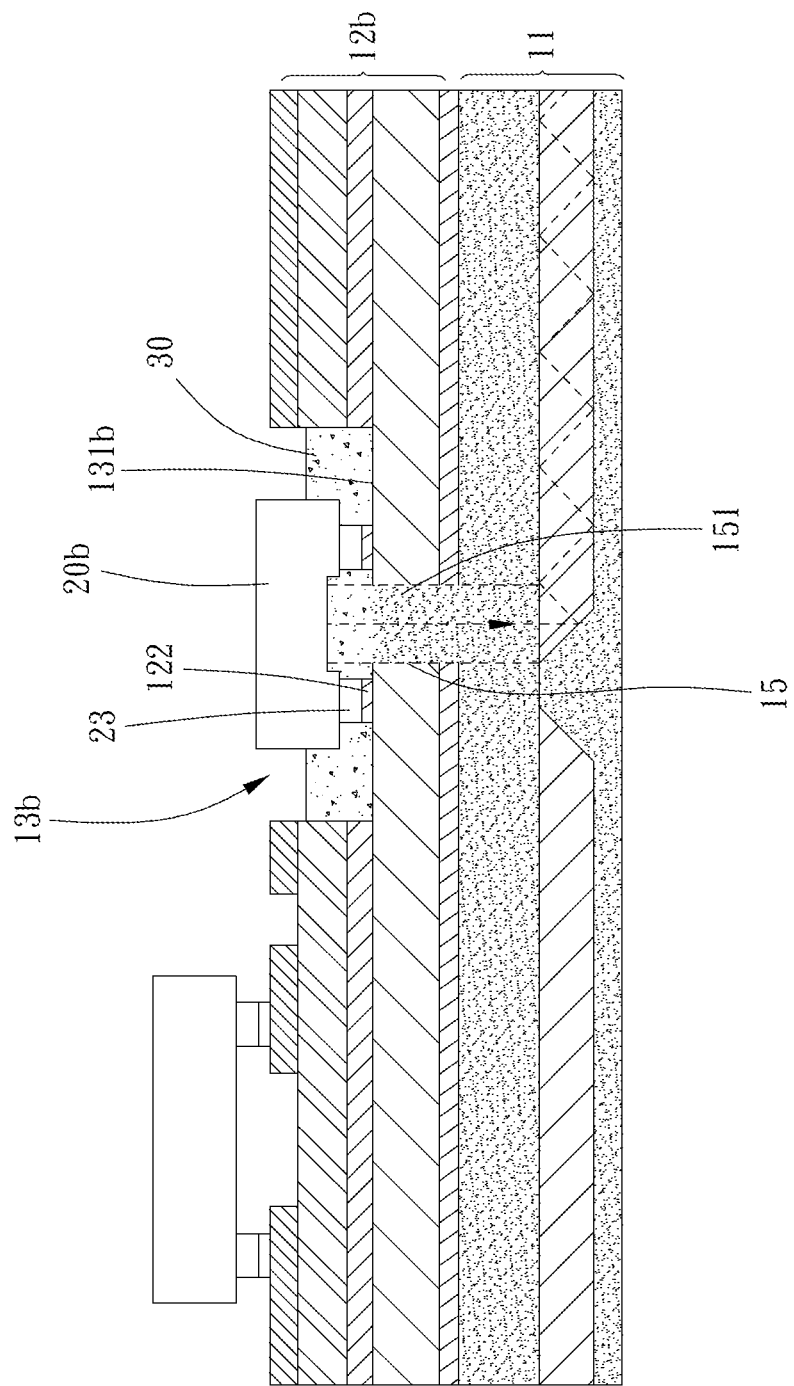

In this embodiment, an electric conductive face 22 of the optical component is electrically connected with the electric conductive structure 12 by at least one wire 40. Therefore, in the step of mounting the optical component, the light transmission face 21 can be aligned with the reflective face 111 at first, and then the at least one wire 40 is connected between the electric conductive face 22 and the electric conductive structure 12, which provides accurate alignment and less light loss. Preferably, the electric conductive face 22 and the light transmission face 21 are located at two opposite sides of the optical component so that the at least one wire 40 is easy to be attached to the electric conductive face 22. In other embodiments as shown in FIGS. 12 to 14, the substrate 10 is formed with at least one contact 122 electrically connected with the electric conductive structure 12, 12a, 12b, and at least one pin 23 of the optical component is connected with the at least one contact 122. It is noted that the electrical connection between the optical component and the electric conductive structure may be provided in any suitable way according to various requirements and/or applications.

Thereby, a transmission device being made by the method as described above is provided. Preferably, the substrate 10 further includes a refractive portion 14 (region between dashed lines) connected between the light transmission face 21 and the reflective face 111, and the refractive portion 14 is provided with a progressive refractive index which is progressively increased or progressively decreased from the light transmission face 21 to the reflective face 111. The refractive portion 14 includes a plurality of layers of different refractive indices for effectively and reliably refracting the transmission signal. The plurality of layers may be integrally formed or formed layer by layer. In this embodiment, a refractive portion 14 is provided with a progressive refractive index progressively increasing and includes a part 141 of the adhesive material 30 with a refractive index of 1.49 and a part 142 of the first layer 113 with a refractive index of 1.554, and the transmission layer 112 is provided with a refractive index of 1.57. In other embodiments, a refractive portion may be provided with a progressive refractive index progressively decreasing and includes an upper layer with a refractive index of 1.64, an interposed layer with a refractive index of 1.60 and an part of the first layer 113 with a refractive index of 1.554, and the transmission layer is provided with a refractive index of 1.57. It is noted that the refractive portion may include two or more than three layers of different refractive indices and that their refractive indices may not be limited to those values mentioned above.

Figure 2:
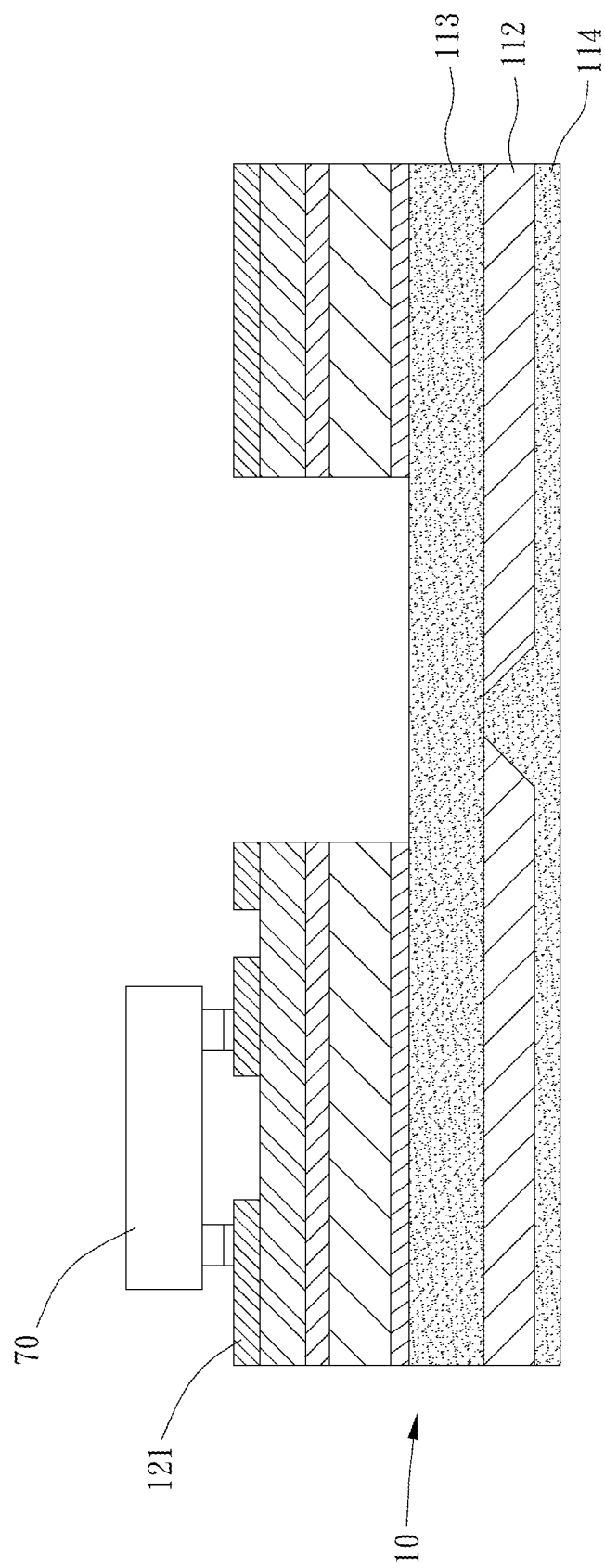
Figure 3:
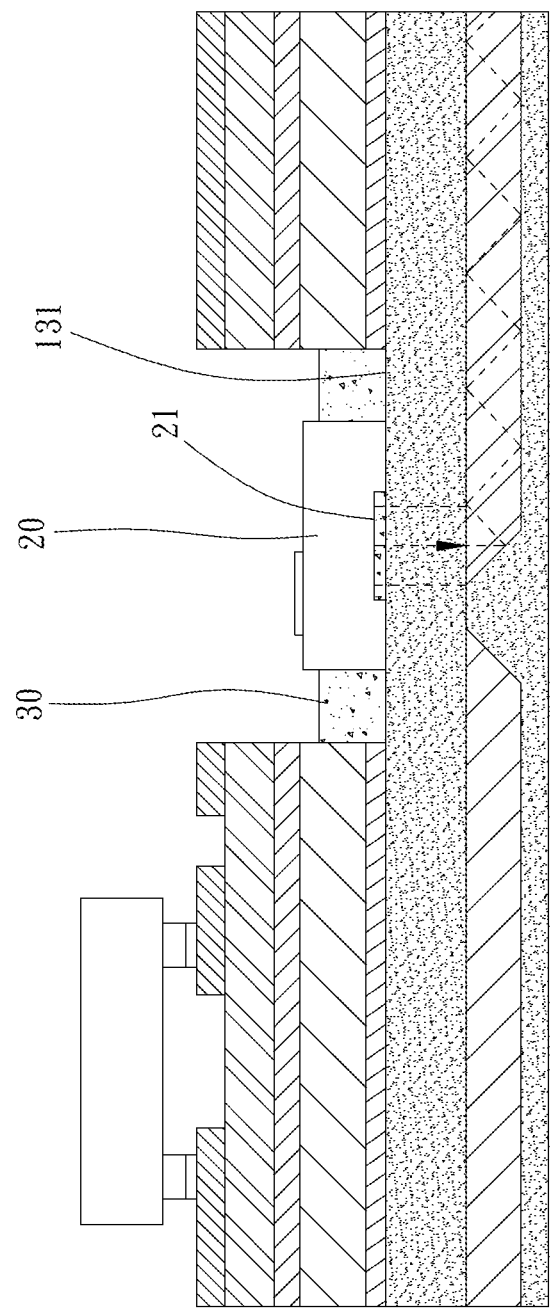
Figure 6:
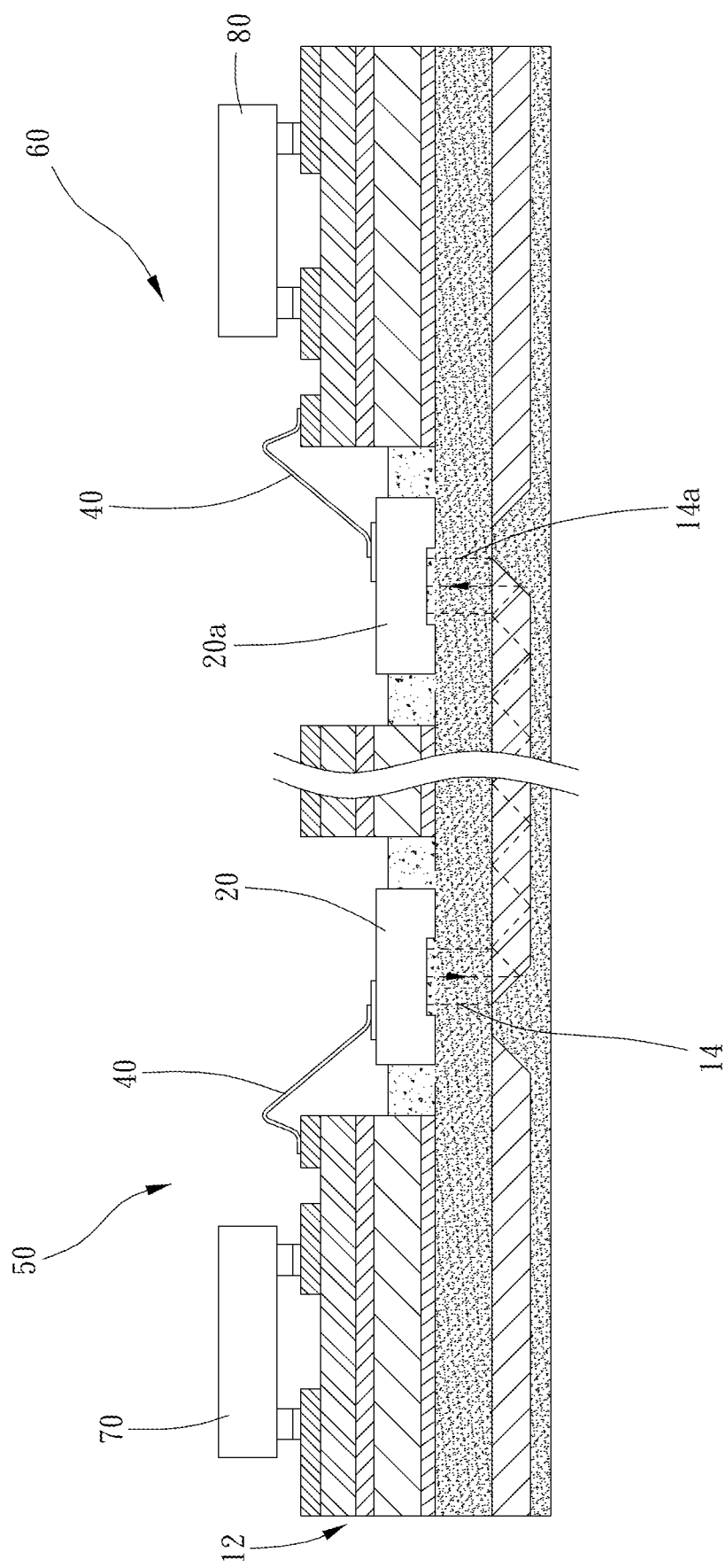
FIG. 6 is a drawing showing a transmission device including transmitting (Tx) and receiving (Rx) modules according to a preferable embodiment of the present invention.

In an exemplary embodiment as shown in FIG. 6, the transmission device further includes a transmitting (Tx) end 50, a receiving (Rx) end 60, a driver IC 70 and a transimpedance amplifier (TIA) 80. The driver IC 70 and the transimpedance amplifier 80 may be mounted to the substrate 10 before or after assembling the optical component, as shown in FIG. 2. The optical transmitter 20 (such as vertical cavity surface emitting laser (VCSEL) or LED) is arranged at the Tx end 50 and is electrically connected with the driver IC 70 via the one said wire 40, and an optical receiver 20a (such as photodiode (PD)) is arranged at the Rx end 60 and is electrically connected with the transimpedance amplifier 80 via one said wire 40. The optical transmitter 20 and the optical receiver 20a are respectively received within one said cavity 13 and correspond to one said refractive portion 14, 14a, and the driver IC 70 and the transimpedance amplifier 80 are connected with the at least one electric conductive layer 121.

In practice, the divergence angle of the light of a conventional optical transmission device with an air gap between the signal guide and the optical transmitter or the optical receiver can be 32 degrees or more; however, at the Tx end 50, the divergence angle of the light of the transmission device of the present invention can be narrowed by the refractive portion 14 provided with the progressive refractive index, and at the Rx end 60, the divergence angle of the light can be narrowed by the refractive portion 14a. This can efficiently improve transmission efficiency and optical coupling efficiency.

Figure 7:
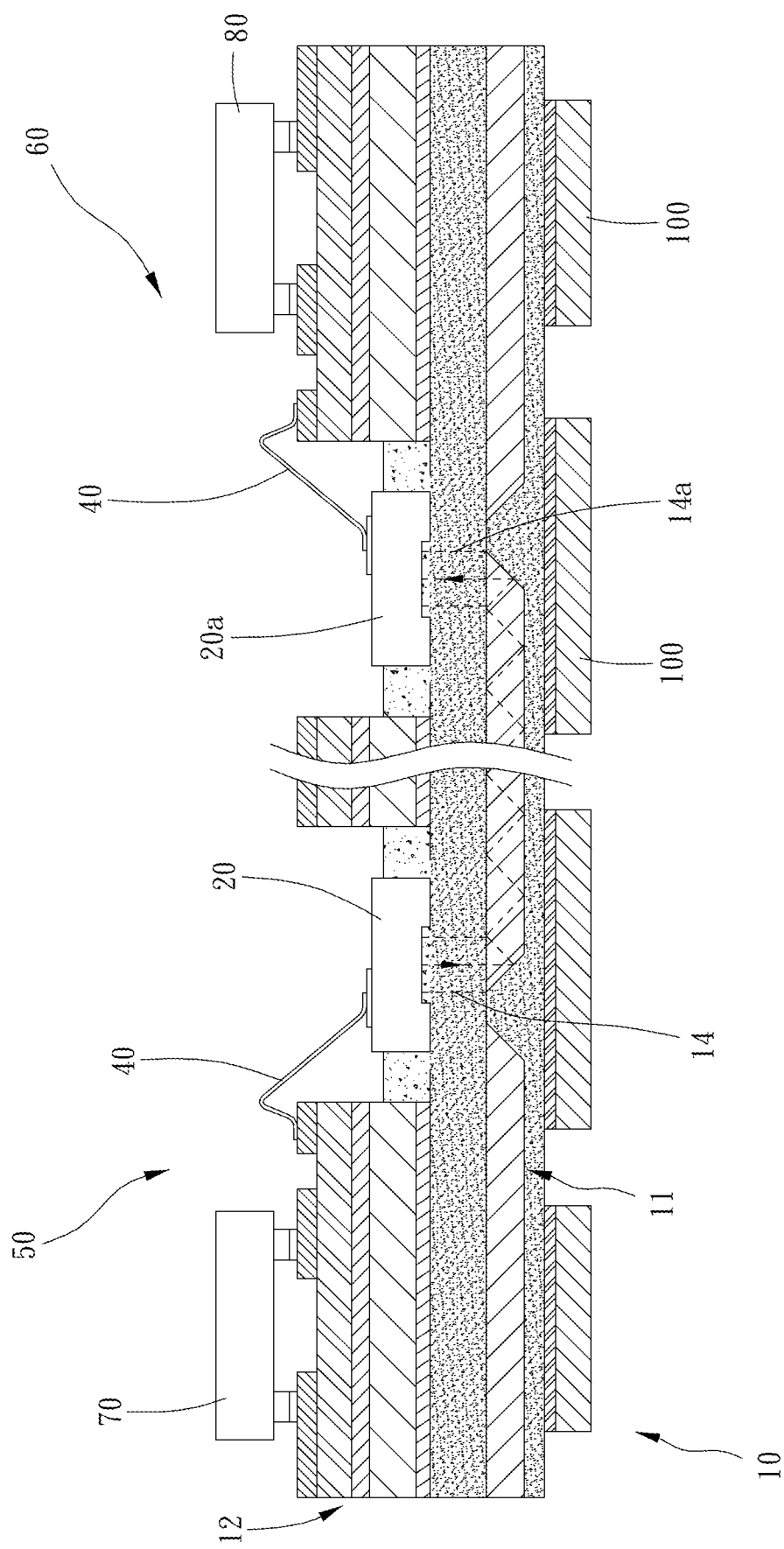
FIGS. 7 and 9 are drawings showing transmission devices including supporters according to preferable embodiments of the present invention.
Figure 8:
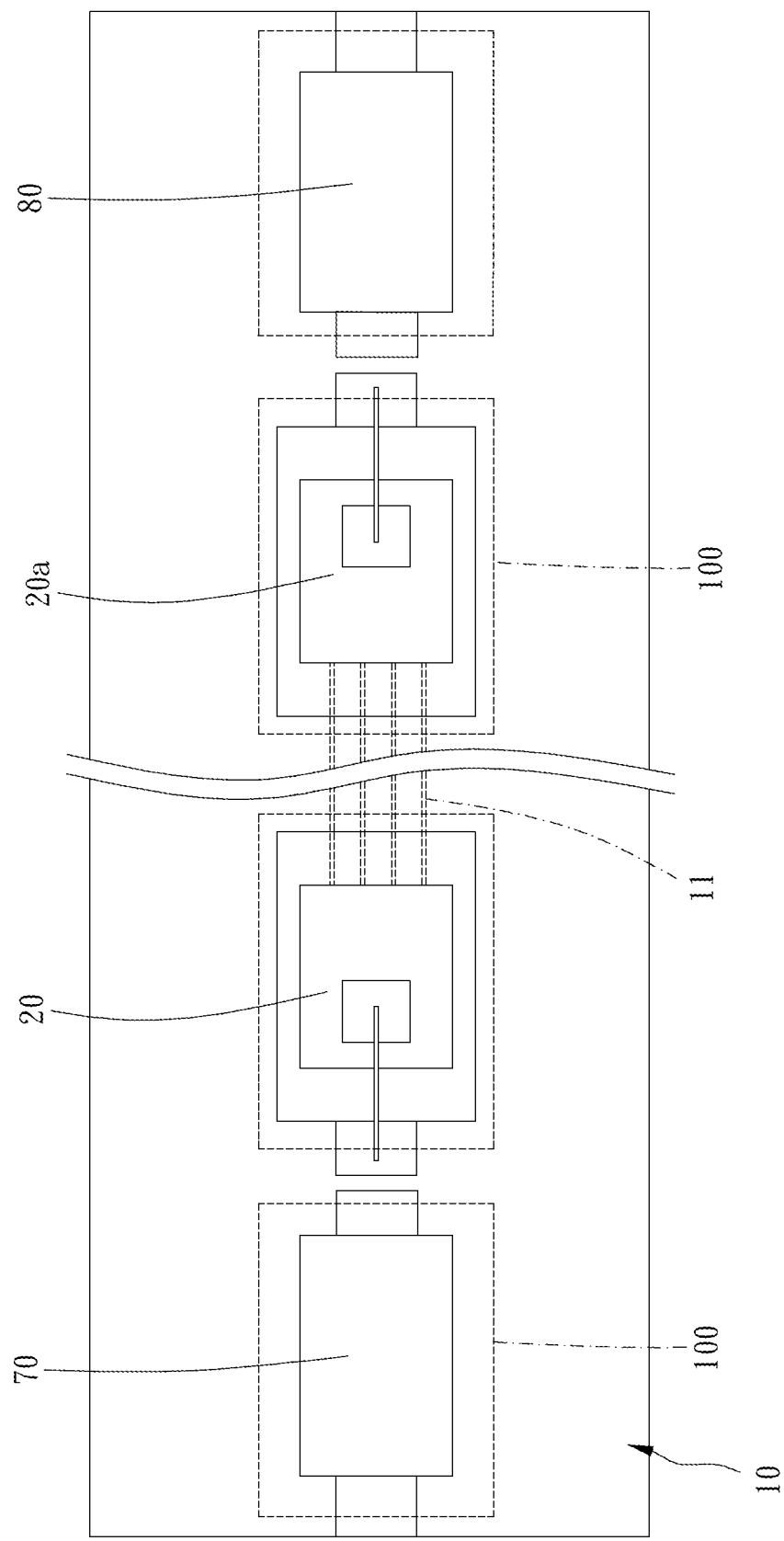
FIG. 8 is a top plan view of FIG. 7.
Figure 9:
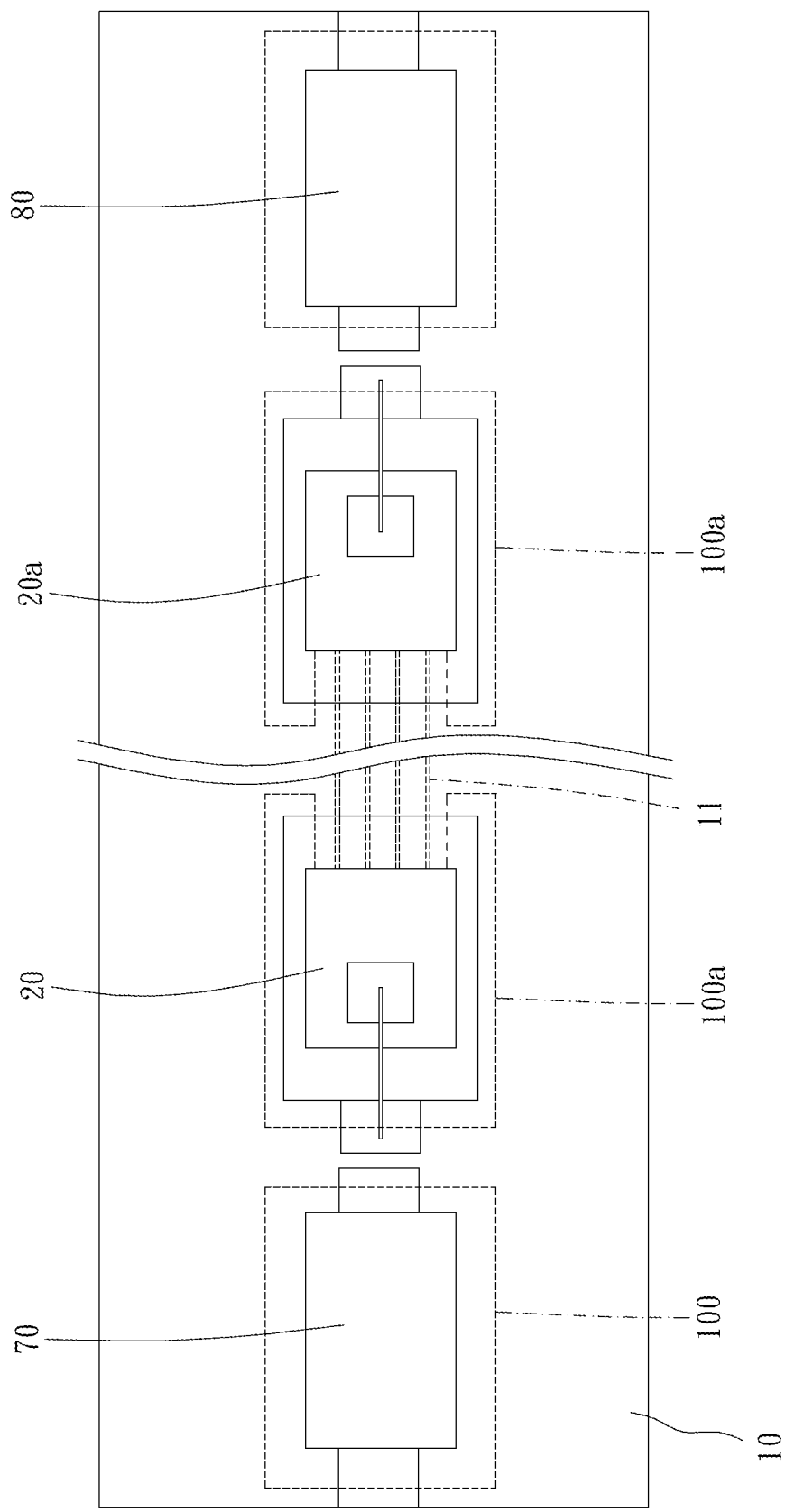

Preferably, in an exemplary embodiment as shown in FIGS. 7 and 8, the substrate 10 further includes at least one supporter 100 partially covering a side of the signal guide 11 opposite to the optical component, and the at least one supporter 100 corresponds to the optical component, which can strengthen the substrate 10. In this embodiment, the substrate 10 includes a plurality of said supporters 100 which correspond to the optical transmitter 20, the optical receiver 20a, the driver IC 70 and the transimpedance amplifier (TIA) 80, respectively. Therefore, the plurality of said supporters 100 provides local enhancement of stiffness of the substrate 10 for easy positioning and assembling of the optical components and related elements, meanwhile, parts of the substrate 10 between two of said supporters 100 may be flexible. The plurality of said supporters 100 are made of at least one of inorganic and organic materials which may contain metal (such as stainless steel), polymer (such as polyimide), FR-4 material etc. In other embodiments, at least one of said supporters 100a corresponding to at least one of the optical transmitter 20 and the optical receiver 20a may extend along two opposite sides of the signal guide 11, as shown in FIG. 9; one said supporter may correspond to the optical transmitter and the driver IC, and another said supporter may correspond to the optical receiver and the transimpedance amplifier. It is noted that the number and arrangement of said supporters may be provided in any suitable way according to various requirements and/or applications.

Figure 11:
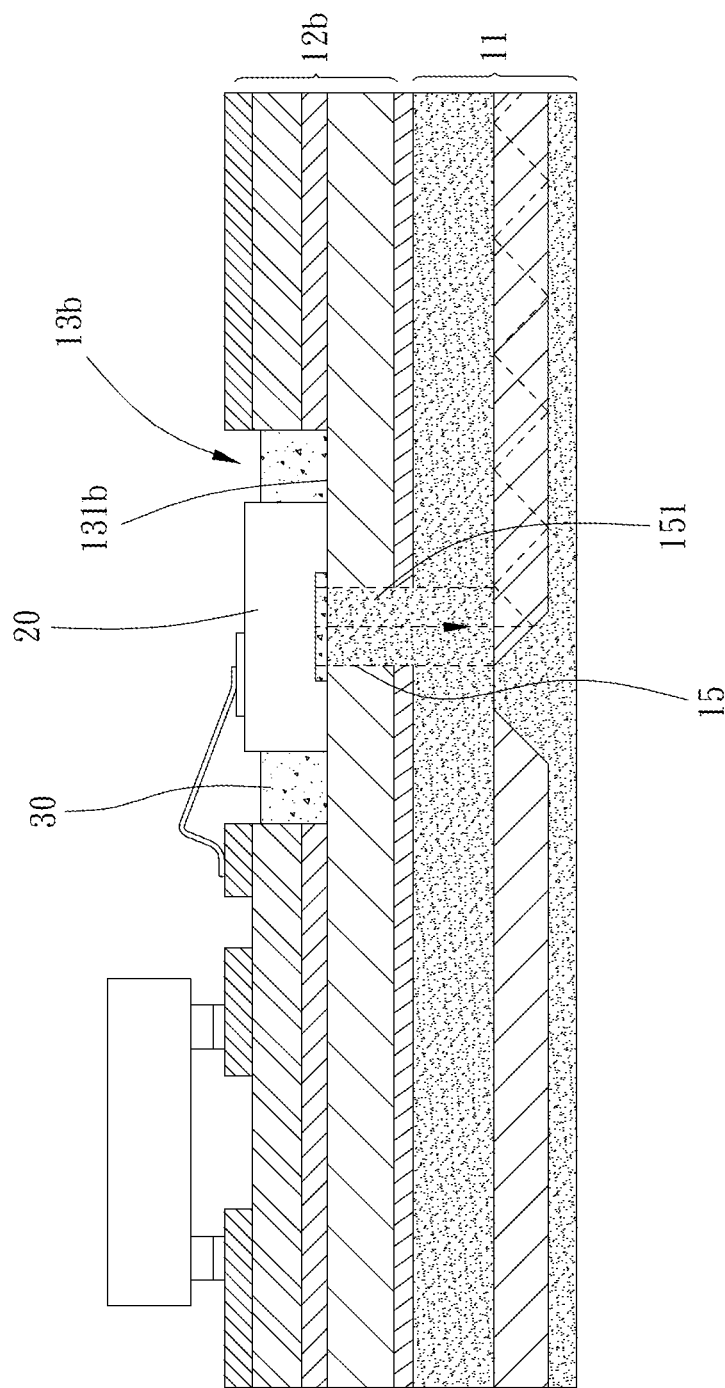

In an exemplary embodiment as shown in FIG. 11, the step of preparing the substrate 10 further includes a step of forming a channel 15 exposed to the bottom side 131b of the cavity 13b and extending toward the signal guide 11. The cavity 13b is recessed on the electric conductive structure 12b, and the channel 15 is filled with a light guiding material 151. In this embodiment, the light guiding material 151 is integrally formed by a part of the first layer 113 so as to guild the light transmitted therethrough. In other embodiments, the light guiding material may be formed by any suitable material with appropriate refractive index. In another exemplary embodiment as shown in FIG. 14, it is different from the exemplary embodiment as shown in FIG. 11 in that: the optical component (the optical transmitter 20b) is electrically connected with the electric conductive structure 12b by said pins 23 and said contacts 122.

Figure 15:
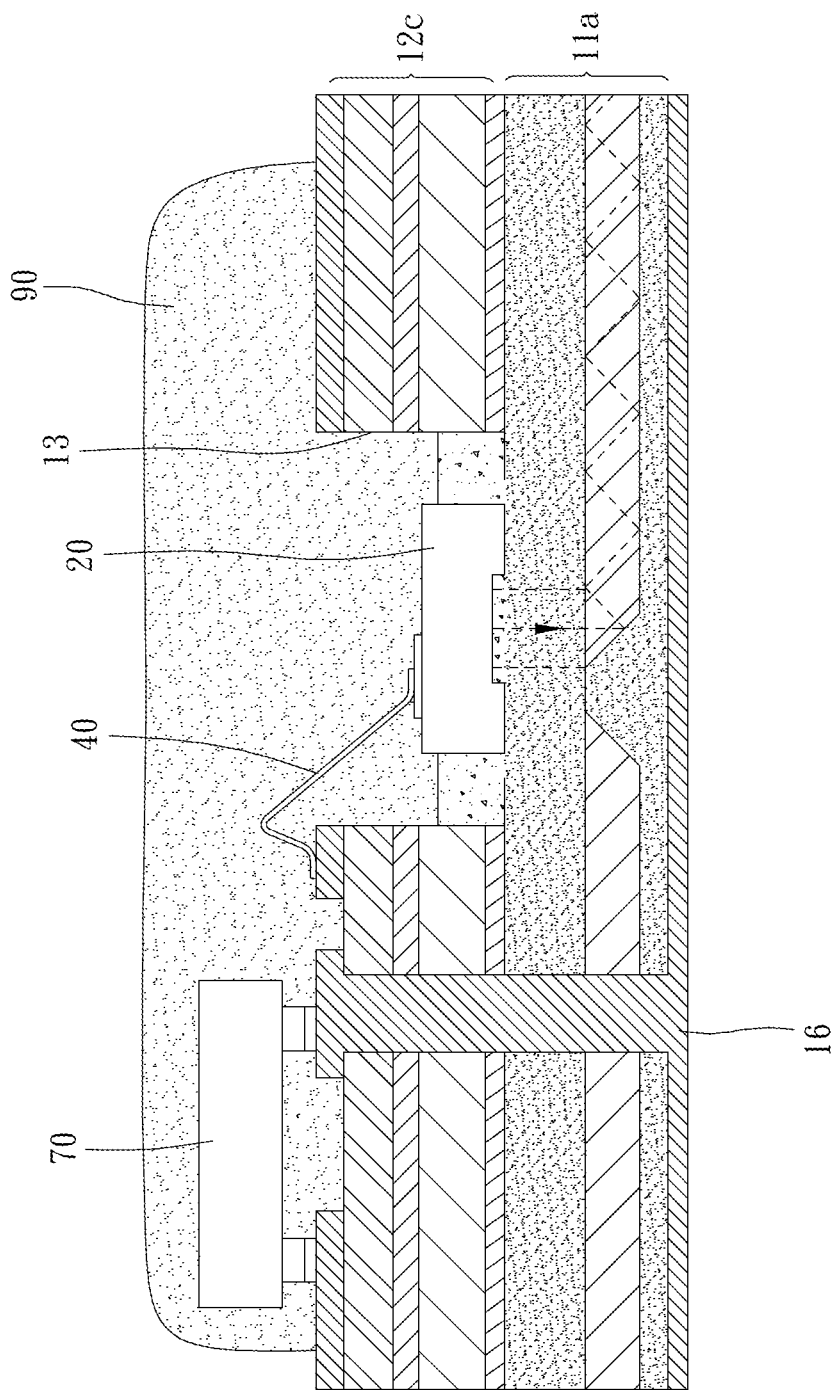
FIGS. 15 and 16 are drawings showing transmission devices including covering component according to preferable embodiments of the present invention.

In an exemplary embodiment as shown in FIG. 15, at least one conductive component 16 is arranged to the substrate 10 and at least partially penetrates within at least one of the electric conductive structure 12c and the signal guide 11a. The at least one conductive component 16 is connected with the electric conductive structure 12c. The at least one conductive component 16 is selected from at least one of a thermal conductive component and an electric conduct via. In this embodiment, each of the at least one conductive component 16 is metallic and solid and extends through both of the electric conductive structure 12c and the signal guide 11a for providing good heat dissipation and electric conduction. In other embodiments, the at least one conductive component 16a may only penetrate from the electric conductive structure 12a to the first layer 113a (FIG. 13) or only disposed through the electric conductive structure; each said conductive component may be hollow and be filled up with at least one of inorganic and organic solid substances for providing good heat dissipation and expansive electric arrangement, respectively. It is noted that the at least one conductive component may be provided in any suitable shape or configuration according to various requirements and/or applications.

Figure 16:
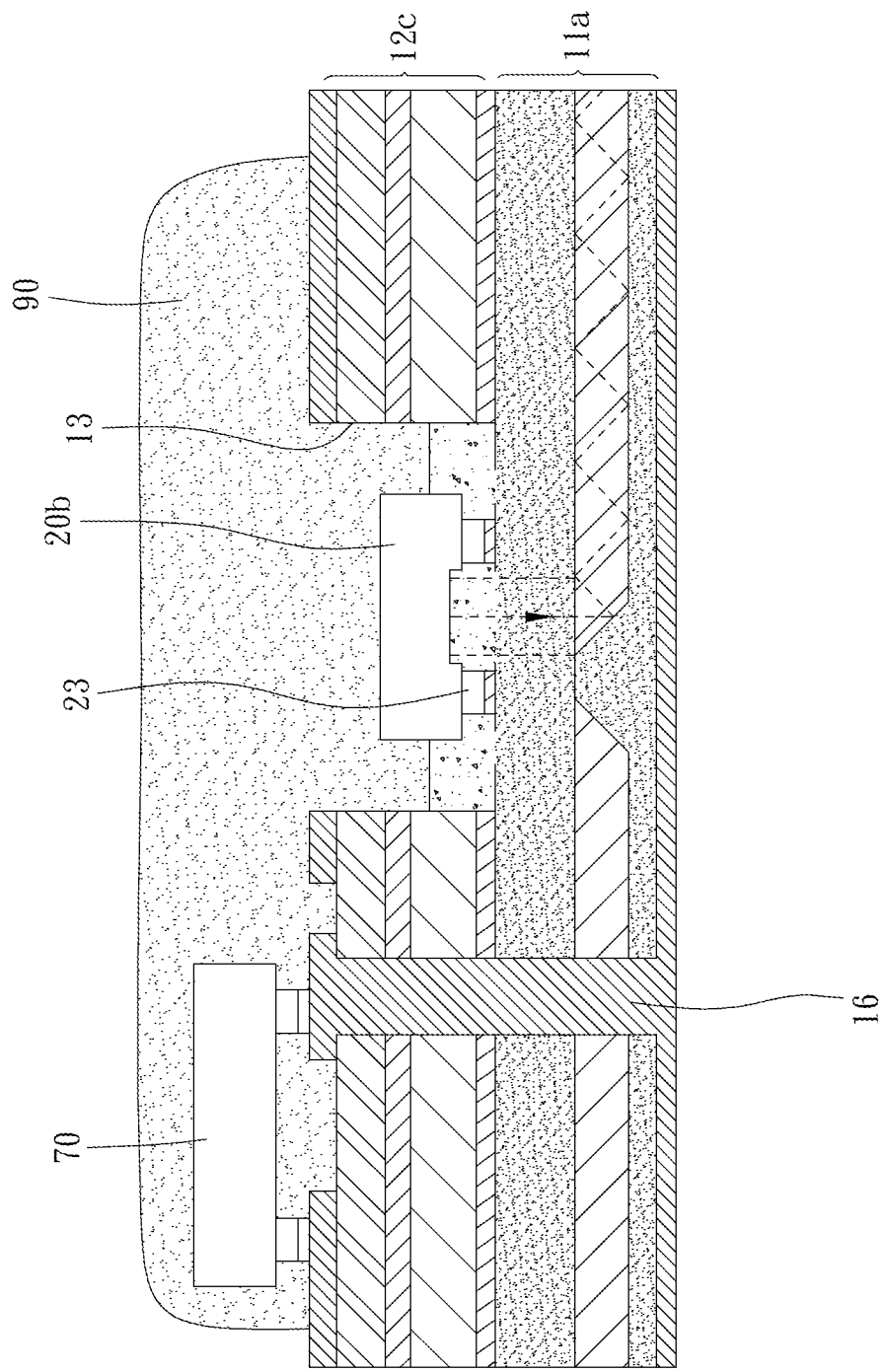

Preferably, the optical component is covered with a covering component 90, and the covering component 90 may be molding compound and is provided with electromagnetic wave shielding and a thermal conductivity greater than 3 W/mK, which can lower the electromagnetic wave interference and improves thermal effect. Specifically, the covering component 90 is filled up the cavity 13 and entirely covers the at least one wire 40 so as to avoid relative movement of components and have good assembling stability. In another exemplary embodiment as shown in FIG. 16, the optical component may be electrically connected with the electric conductive structure 12c by said pins 23 and said contacts 122.

Figure 17:
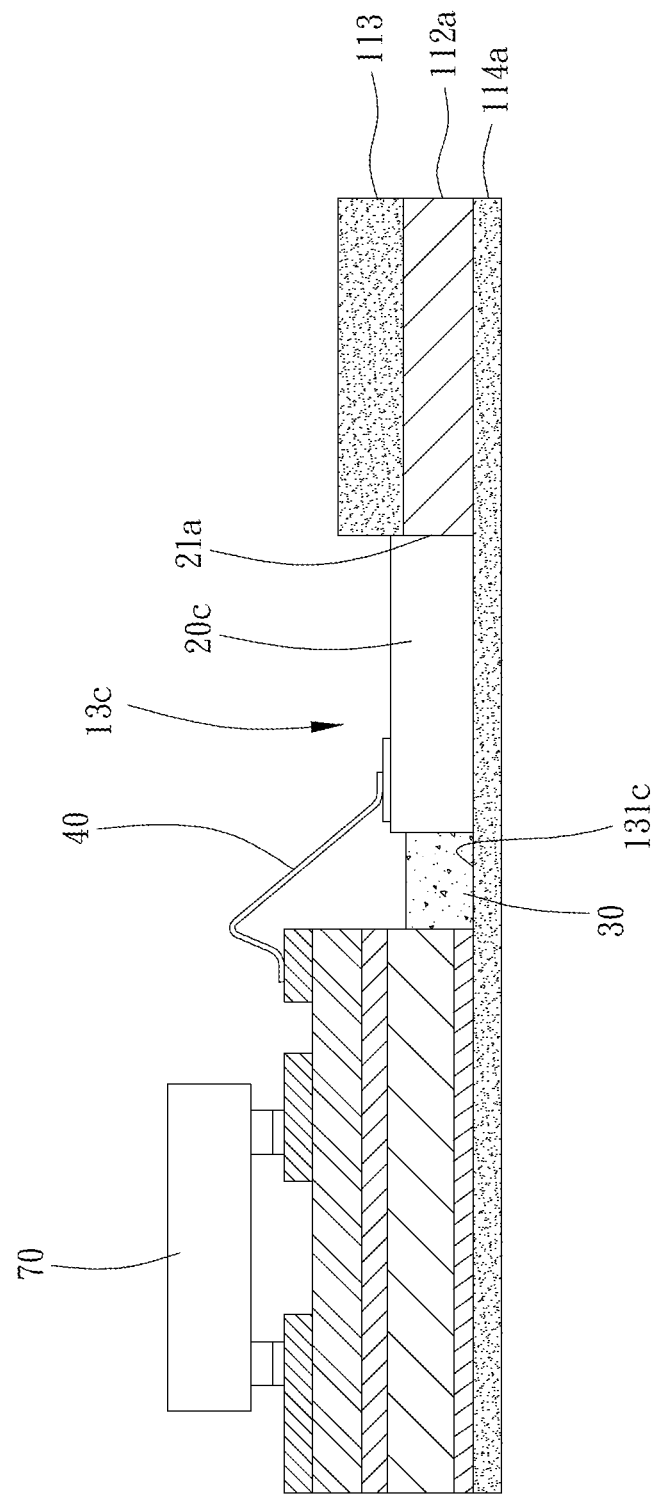
FIGS. 17 and 18 are drawings showing transmission devices including edge transmitted components according to preferable embodiments of the present invention.
Figure 18:
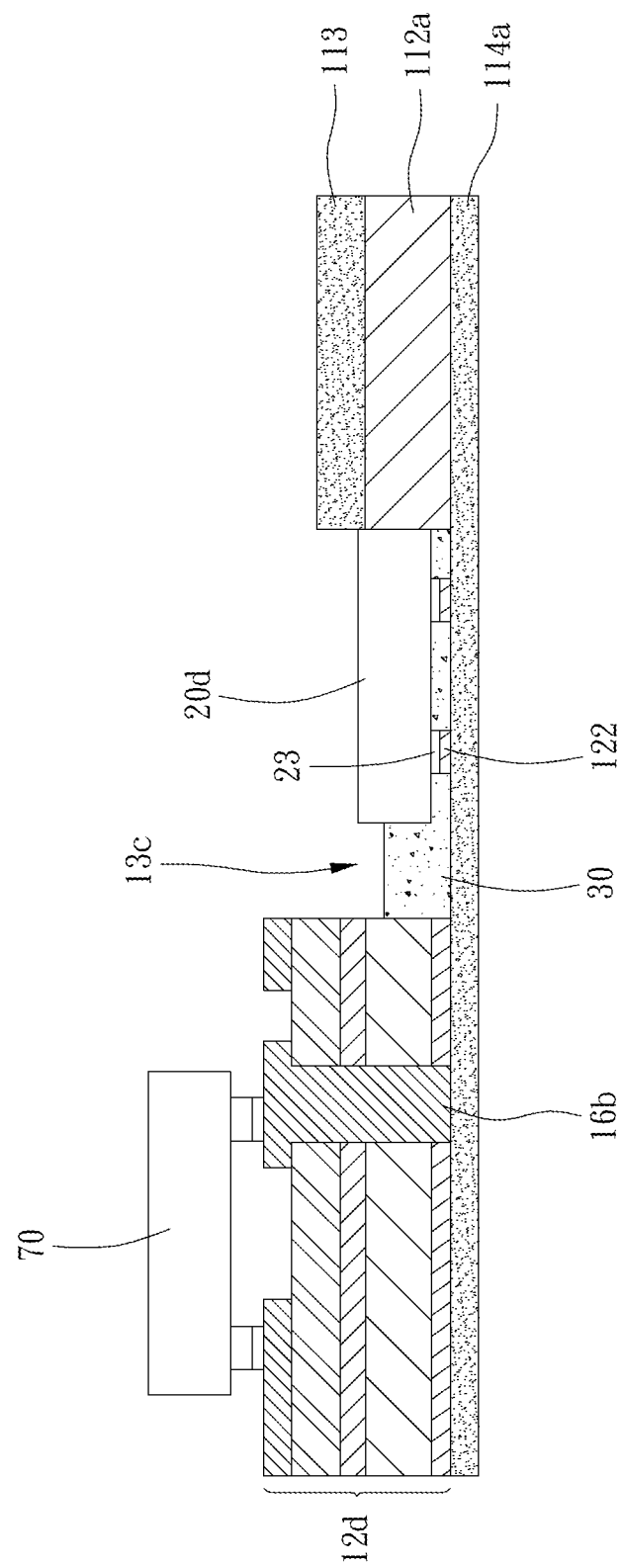

In an exemplary embodiment as shown in FIG. 17, the electric conductive structure 12 is disposed on the second layer 114a and laterally spaced apart from the transmission layer 112a and the first layer 113 disposed on the transmission layer 112a. The cavity 13c is defined between a lateral side of the electric conductive structure 12 and a lateral side of the transmission layer 112a. The second layer 114a is exposed to the bottom side 131c of the cavity 13c and the optical component (such as edge emitting laser 20c) is disposed on the second layer 114a with the light transmission face 21a laterally corresponding to the transmission layer 112a. Therefore, the transmission signal is directly and straightly transmitted between the optical component and the transmission layer 112a without reflective face, which minimizes divergence of light and optical loss and provides accurate coupling. In another exemplary embodiment as shown in FIG. 18, it is different from the exemplary embodiment as shown in FIG. 17 in that: the optical component (edge emitting laser 20d) is electrically connected with the electric conductive structure 12d by said pins 23 and said contacts 122; and the electric conductive structure 12d has one said conductive component 16b disposed therethrough for good heat dissipation and electric conduction.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of manufacturing a device with an optical component disposed thereon, including following steps of:
   preparing a substrate, the substrate including a signal guide and an electric conductive structure;
   forming a cavity on the substrate; and
   mounting the optical component on the substrate and corresponding a light transmission face of the optical component to the signal guide, wherein the optical component and the substrate are connected by an adhesive material and the optical component is electrically connected with the electric conductive structure:
   wherein the optical component is arranged within the cavity;
   wherein the light transmission face faces a bottom side of the cavity and corresponds to a reflective face of the signal guide, and the adhesive material is selected from an optical auxiliary material being light-transmittable and is at least partially filled between the bottom side and the light transmission face.

2. The method of manufacturing the device with the optical component disposed thereon of claim 1, wherein the signal guide includes a transmission layer and a first layer located a side of the transmission layer adjacent to the electric conductive structure, at least one of the transmission layer and the first layer is exposed to the cavity, and the optical component is disposed on one of the transmission layer and the first layer.

3. The method of manufacturing the device with the optical component disposed thereon of claim 1, further including a step of forming a channel exposed to the cavity and extending toward the signal guide, wherein the cavity is recessed on the electric conductive structure, and the channel is filled up with a light guiding material.

4. The method of manufacturing the device with the optical component disposed thereon of claim 1, wherein the signal guide includes a transmission layer, a first layer located at a side of the transmission layer adjacent to the electric conductive structure and a second layer opposite to the first layer, and the second layer is exposed to the cavity and the optical component is disposed on the second layer.

5. The method of manufacturing the device with the optical component disposed thereon of claim 1, wherein an electric conductive face of the optical component is electrically connected with the electric conductive structure by at least one wire.

6. The method of manufacturing the device with the optical component disposed thereon of claim 1, wherein the substrate is formed with at least one contact electrically connected with the electric conductive structure, and at least one pin of the optical component is connected with the at least one contact.

7. The method of manufacturing the device with the optical component disposed thereon of claim 1, further including a step of arranging at least one conductive component at least partially penetrating within at least one of the electric conductive structure and the signal guide, wherein the at least one conductive component is connected with the electric conductive structure.

8. The method of manufacturing the device with the optical component disposed thereon of claim 7, wherein the at least one conductive component is selected from at least one of a thermal conductive component and an electric conduct via.

9. The method of manufacturing the device with the optical component disposed thereon of claim 1, wherein the substrate further includes at least one supporter partially covering a side of the signal guide opposite to the optical component, the at least one supporter corresponds to the optical component, and the at least one supporter is made of at least one of inorganic and organic materials.

10. The method of manufacturing the device with the optical component disposed thereon of claim 1, wherein the optical component is at least partially exposed out of the adhesive material.

11. The method of manufacturing the device with the optical component disposed thereon of claim 10, further including a step of covering the optical component with a covering component.

12. A transmission device, being made by the method of manufacturing the device with the optical component disposed thereon of claim 1.

13. The transmission device of claim 12, wherein the substrate further includes a refractive portion connected between the light transmission face and a reflective face of the signal guide, and the refractive portion is provided with a progressive refractive index which is progressively increased or progressively decreased from the light transmission face to the reflective face.

14. A method of manufacturing a device with an optical component disposed thereon, including following steps of:
preparing a substrate, the substrate including a signal guide and an electric conductive structure; and
mounting the optical component on the substrate and corresponding a light transmission face of the optical component to the signal guide, wherein the optical component and the substrate are connected by an adhesive material and the optical component is electrically connected with the electric conductive structure:
wherein an electric conductive face of the optical component is electrically connected with the electric conductive structure by at least one wire:
wherein the electric conductive face and the light transmission face are located at two opposite sides of the optical component.

\* \* \* \* \*